Patented Feb. 18, 1930

1,747,751

UNITED STATES PATENT OFFICE

JESSE O. BETTERTON, OF OMAHA, NEBRASKA, ASSIGNOR TO AMERICAN SMELTING AND REFINING COMPANY, OF NEW YORK, N. Y., A CORPORATION OF NEW JERSEY

PROCESS OF MANUFACTURING WHITE ZINC CHLORIDE

No Drawing.    Application filed September 1, 1927.   Serial No. 217,006.

This invention relates to the formation and purification of zinc chloride from the small percentages of zinc remaining in lead bullion after desilverization by the Parke's process.

It is essential to remove zinc from lead bullion in order to bring the lead to the purity required in certain types of refined lead specifications. The removal should obviously be accomplished with as small a loss of both lead and zinc as possible. The zinc should preferably be removed in such form that it may be commercially usable as a by-product and thereby defray a portion of the expense of its removal.

One method of separating the zinc from the lead comprises reacting the molten lead bullion with chlorine with the consequent production of zinc chloride which may be removed in the form of a slag. This slag, however, contains an appreciable amount of lead and other impurities in the form of chlorides or oxychlorides which must be removed before the zinc chloride is commercially usable.

The lead compounds may be removed from the zinc chloride by remelting the same and reacting the molten chloride with an excess of zinc which will replace the lead and form further quantities of pure zinc chloride. It has been found, however, that salability is increased by producing a white or substantially white zinc chloride. Consequently, the product above described must be treated prior to being placed in drums for sale.

This invention, therefore, provides for the production of zinc chloride as a by-product during the refining of lead, and for the whitening of said chloride for rendering the same commercially usable.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood however, that the processes and the steps thereof may be modified in various respects without departing from the broad spirit and scope of the invention.

In the following description and in the claims, the various steps in the process and the details comprising the invention will be identified by specific names for convenience but they are intended to be as generic in their application as the art will permit.

The process according to this invention comprises dezincing lead bullion, which has been desilverized in accordance with the Parke's process, and forming the zinc into commercially pure zinc chloride. This may be accomplished by circulating a portion of molten bullion through a reaction chamber containing chlorine. The chlorine will react with the zinc contained in the bullion and produce zinc chloride which, being lighter than the molten lead, will float on the surface thereof in the form of a slag. The temperature of the bullion during this operation should be carefully regulated and maintained sufficiently high to prevent the lead from freezing during the process, but not above the volatilization point of the zinc chloride. It has been found that temperatures near the upper permissible limits, as for example between 650°–750° F., permit the reaction to be carried on more rapidly.

After the zinc chloride has formed upon the surface of the lead as a slag, it may be removed by skimming and taken to suitable containers for the deleading operation. The deleading may be accomplished by remelting the slag and reacting the same with an excess of zinc over that required to chemically replace the lead which may be present. Continuous circulation should be maintained during the deleading process in order to insure an intimate reaction throughout the various parts of the slag.

The lead and other metallic elements which are displaced from the zinc chloride will sink to the bottom of the container, whence they may be removed by tapping. The zinc chloride, however, being lighter will float upon the surface of the lead and may be removed by any desirable means such as a subsequent tapping above the level of the molten lead, or by skimming. Should the chloride be removed by tapping it is preferable to return the first portion taken from the container since it may be contaminated with lead which has found its way into the tap during the process.

In order to produce a pure zinc chloride slag, the various steps of dezincing and deleading must be carefully carried out in order to avoid contamination thereof. It has been found, for example, that sheet iron pushers should be used in the dezincing operation when skimming rather than wooden pushers, in order to prevent the formation of charcoal or ash which might otherwise contaminate the slag. Pumps should be operated with a minimum amount of oil in order to further reduce the carbon content of the slag since the pump shaft and motor bearings may leak oil into the molten slag during the dezincing operation. This should be prevented in order to keep carbon out of the slag.

During the deleading operation, if any foreign material, such as charcoal should appear on the surface of the bath it should be carefully removed by skimming before circulating the molten zinc chloride and reacting the same with zinc. The deleading operation should preferably be carried out at a temperature below 740 degrees F. in order to avoid excessive loss of zinc chloride by volatilization. Temperatures of approximately 700 degrees are preferable although care must be taken when operating at lower temperatures to prevent the material from freezing in the circulating pipes.

In order to form a zinc chloride conforming to the rigid commercial requirements, the deleading operation should be carried out until the lead content is of the order of .01% or .02%. This requires careful manipulation and accurate regulation of temperatures as well as controlling the time of the reaction by analysis of samples before removing the zinc chloride from the deleading kettles.

The removal of lead from zinc chloride has been described and particularly claimed in my co-pending application, Serial No. 217,005, filed September 1, 1927, for process of forming and purifying zinc chloride.

After the deleading operation, the zinc chloride may be treated with a reagent such as nitre, for producing a pure white solid. The latter should be finely powdered and dried, and a portion thereof placed in the zinc chloride drums before the latter substance is added thereto. When zinc chloride is first introduced in a drum it will be rapidly chilled, and if a quantity of nitre should not be present a black solid would result. Consequently, assuming that two pounds of nitre per drum were required, it has been found preferable to place one half pound in the bottom of the drum before filling.

The slag may then be tapped and the drum partly filled. Since foaming may take place, it is essential to only partly fill the drum during the first part of the reaction.

The remainder of the nitre may then be placed in the drum and the filling completed. The zinc chloride contained therein will then solidify in a pure white condition.

The amount of nitre should be carefully regulated since an excess thereof would cause the slag to turn a brown color. Furthermore, the reagent must be carefully dried since a comparatively small amount of moisture will cause the mixture to foam to an excessive degree.

By means of the above described process, the zinc which is removed during the refining of lead is formed into a valuable by-product in a commercially usable condition. This result may be accomplished in accordance with the present invention by controlling the elimination of lead from the zinc chloride until the residue thereof is approximately .02 percent. It is essential as above pointed out, to accurately control the temperature within the prescribed limits and to carry on the deleading operation until analysis of samples taken therefrom shows that the lead content has been reduced to the required amount.

The zinc contained in the lead bullion may be converted into zinc chloride and separated from the bullion as above described without substantial loss of zinc chloride due to fuming, provided the prescribed temperature limits are carefully observed and the chloride itself will not volatilize to any appreciable extent provided a temperature of 750° F. is not exceeded. At higher temperatures although the reaction may be carried on more rapidly the benefits will be largely offset by the increased loss of chloride as a fume.

During the dezincing operation, sufficient heat is ordinarily produced by the reaction to maintain the bath at the required temperature. It is therefore, not necessary to supply external heat after the reaction has been started but on the other hand, cooling of the bath is frequently required to prevent temperature from exceeding the upper permissible limits.

The entire operation of dezincing the lead, deleading the zinc chloride and cooling the latter substance in the presence of nitre may be carried on with inexpensive apparatus and without excessive labor charges.

What is claimed is:

1. The process of treating zinc chloride comprising reacting the same in a molten condition with nitre, whereby upon solidification a substantially white substance is obtained.

2. The process of treating zinc chloride, comprising reacting the same in a molten condition with finely powdered nitre, whereby upon solidification a substantially white zinc chloride is obtained.

3. The process of purifying zinc chloride which comprises adding a quantity of nitre to a container, pouring an amount of molten zinc chloride therein sufficient to partly fill said container, adding further quantities of said nitre and subsequently completely filling said container with molten zinc chloride whereby upon cooling a white substance is produced.

4. The process of forming white zinc chloride which comprises adding a quantity of nitre to a container, pouring an amount of molten zinc chloride therein sufficient to partly fill said container, adding further quantities of said nitre and after foaming has ceased, completely filling said drums with molten zinc chloride whereby upon cooling a white substance is produced.

In testimony whereof I have hereunto set my hand.

JESSE O. BETTERTON.